(12) United States Patent
Furmanek et al.

(10) Patent No.: US 11,466,899 B2
(45) Date of Patent: Oct. 11, 2022

(54) SYSTEMS AND METHODS FOR CONTROLLING GAS POWERED APPLIANCES

(71) Applicant: SIT MANUFACTURING N.A. S.A. DE C.V., Ciénega de Flores N.L. (MX)

(72) Inventors: Daniel L. Furmanek, Ballwin, MO (US); Saad Chaudry, St. Louis, MO (US)

(73) Assignee: SIT MANUFACTURING N.A. S.A. DE C.V., Ciánega de Flores N.L. (MX)

( * ) Notice: Subject to any disclaimer, the term of this patent is extended or adjusted under 35 U.S.C. 154(b) by 216 days.

(21) Appl. No.: 16/589,913

(22) Filed: Oct. 1, 2019

(65) Prior Publication Data

US 2021/0095893 A1 Apr. 1, 2021

(51) Int. Cl.
| | |
|---|---|
| *F24H 9/20* | (2022.01) |
| *F24H 1/08* | (2022.01) |
| *G05B 15/02* | (2006.01) |
| *F24H 1/18* | (2022.01) |
| *F24H 15/31* | (2022.01) |
| *F24H 9/00* | (2022.01) |
| *F24H 9/13* | (2022.01) |

(52) U.S. Cl.
CPC ............ *F24H 9/2035* (2013.01); *F24H 1/08* (2013.01); *F24H 1/186* (2013.01); *F24H 9/0026* (2013.01); *F24H 9/136* (2022.01); *F24H 15/31* (2022.01); *G05B 15/02* (2013.01)

(58) Field of Classification Search
CPC ...... F24H 9/2035; F24H 9/126; F24H 9/0026; F24H 1/186; F24H 1/08; G05B 15/02; Y10T 137/043; Y10T 137/87917; Y10T 137/00; F16K 31/025; F16K 29/00; F16K 29/02; B08B 7/02; F02D 2011/108; F23N 1/005; F23N 5/245; F23L 3/00
USPC ....................... 137/15.03; 700/299, 300, 282
See application file for complete search history.

(56) References Cited

U.S. PATENT DOCUMENTS

| | | | | |
|---|---|---|---|---|
| 4,168,719 | A | * | 9/1979 | Renshaw ................. F23N 1/005 137/312 |
| 4,694,890 | A | * | 9/1987 | Zarate .................... F25B 49/022 165/256 |
| 5,504,306 | A | * | 4/1996 | Russell ................. F24H 9/2028 219/497 |

(Continued)

FOREIGN PATENT DOCUMENTS

EP 0138171 A2 4/1985

*Primary Examiner* — Michael G Hoang
*Assistant Examiner* — Andrew W Cheung
(74) *Attorney, Agent, or Firm* — Fitch, Even, Tabin & Flannery LLP

(57) ABSTRACT

A method of controlling a gas powered water heater includes attempting to pick a main gas valve of the main burner using a first pick method. The first pick method includes closing a switch of a valve pick system to couple a capacitor of the valve pick system to the main gas valve for a first length of time to discharge energy stored in the capacitor to the main gas valve, and opening the switch of the valve pick system after the energy stored in the capacitor is discharged to the main gas valve. The controller determines if the main gas valve is open after using the first pick method. When the controller determines the main gas valve is not open, the controller attempts to pick the main gas valve using a second pick method different than the first pick method.

24 Claims, 11 Drawing Sheets

(56) References Cited

U.S. PATENT DOCUMENTS

| | | |
|---|---|---|
| 5,660,328 A | 8/1997 | Momber |
| 5,873,518 A | 2/1999 | Richmond |
| 6,170,506 B1 * | 1/2001 | Butwin ............... F16K 31/0675 |
| | | 137/15.06 |
| 6,777,653 B2 * | 8/2004 | Burkhart ................. F23Q 7/24 |
| | | 219/263 |
| 7,192,005 B2 * | 3/2007 | Denyer ............... F16K 31/0613 |
| | | 137/625.64 |
| 7,497,386 B2 | 3/2009 | Donnelly et al. |
| 8,123,517 B2 | 2/2012 | Peruch |
| 8,165,726 B2 | 4/2012 | Nordberg |
| 8,322,312 B2 | 12/2012 | Strand |
| 9,151,516 B2 | 10/2015 | Buescher |
| 9,435,459 B2 * | 9/2016 | Bedingfield ............ F16K 7/045 |
| 9,599,369 B2 * | 3/2017 | Furmanek ........... F24H 9/2035 |
| 9,752,798 B2 | 9/2017 | Buescher |
| 9,829,897 B2 | 11/2017 | Koopman |
| 2005/0145282 A1 * | 7/2005 | Chian .................. H01F 7/1877 |
| | | 137/613 |
| 2006/0013572 A1 | 1/2006 | Phillips |
| 2006/0131528 A1 * | 6/2006 | Long ....................... F16K 29/00 |
| | | 251/62 |
| 2009/0026397 A1 * | 1/2009 | Evers ..................... F16K 31/06 |
| | | 361/170 |
| 2010/0276004 A1 * | 11/2010 | Andersen ................. F16K 1/54 |
| | | 137/1 |
| 2010/0300377 A1 | 12/2010 | Buescher |
| 2015/0220091 A1 | 8/2015 | Koopman |
| 2015/0298625 A1 * | 10/2015 | Kilger .................. H01F 7/1844 |
| | | 310/12.01 |
| 2015/0330665 A1 * | 11/2015 | Furmanek ................. F24H 1/26 |
| | | 431/60 |
| 2015/0338091 A1 * | 11/2015 | Deng ....................... F23L 3/00 |
| | | 431/280 |
| 2015/0352604 A1 * | 12/2015 | Arunasalam .......... F16K 31/025 |
| | | 137/15.06 |
| 2017/0115005 A1 * | 4/2017 | Chian ................... F24H 9/2035 |
| 2018/0100672 A1 * | 4/2018 | Smith ..................... F24H 1/186 |

\* cited by examiner

SYSTEMS AND METHODS FOR CONTROLLING GAS POWERED APPLIANCES

FIELD

The field of the disclosure relates generally to gas powered appliances, and more particularly, to systems and methods for controlling operation of a gas powered water heater.

BACKGROUND

A conventional gas fired water heater includes a water storage tank and gas fired burner assembly for heating water within the tank. In operation, combustion gases generated by the firing of the burner assembly may be directed upwardly through a flue pipe via a hood. The combustion gases serve to transfer heat to the water contained within the storage tank. The top of the water heater may include suitable fittings for connection to a supply of water and a water distribution system with a water inlet provided with a dip tube, which serves to direct the inflow of cold water to the bottom of the tank.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect of the disclosure, a control system for controlling a gas powered water heater to heat water in a storage tank by burning gas at a main burner includes a power system to provide electrical power for the control system, a valve pick system configured to be coupled to a main gas valve of the main burner and to pick the main gas valve from a closed position to an open position, and a controller electrically powered by the power system and communicatively coupled to the valve pick system. The valve pick system includes a capacitor and a switch. The capacitor is configured to store energy from the power system, and the switch configured to selectively couple the capacitor to the main gas valve. The controller is configured to, in response to a determination by the controller to ignite the main burner, attempt to pick the main gas valve from the closed position to the open position using a first pick method by closing the switch of the valve pick system to couple the capacitor to the main gas valve for a first length of time to discharge the energy stored in the capacitor to the main gas valve, and opening the switch of the valve pick system after the energy stored in the capacitor is discharged to the main gas valve. After attempting to pick the main gas valve using the first pick method, the controller determines if the main gas valve is open, and when the controller determines that the main gas valve is not open, attempts to pick the main gas valve from the closed position to the open position using a second pick method different than the first pick method.

In another aspect of the disclosure, a water heater includes a storage tank for storing water, a main burner to burn gas to heat the water in the storage tank, a main gas valve coupled to the main burner and having an open position permitting gas flow through the main gas valve and a closed position preventing gas flow through the main gas valve, and a control system to control operation of the main burner to provide water in the storage tank substantially at a setpoint temperature. The control system includes a valve pick system coupled to the main gas valve of the main burner to pick the main gas valve from a closed position to an open position, and a controller electrically powered by the power system and communicatively coupled to the valve pick system. The valve pick system includes a capacitor and a switch. The capacitor is configured to store energy from the power system, and the switch configured to selectively couple the capacitor to the main gas valve. The controller is configured to, in response to a determination by the controller to ignite the main burner, attempt to pick the main gas valve from the closed position to the open position using a first pick method by: closing the switch of the valve pick system to couple the capacitor to the main gas valve for a first length of time to discharge the energy stored in the capacitor to the main gas valve, and opening the switch of the valve pick system after the energy stored in the capacitor is discharged to the main gas valve. After attempting to pick the main gas valve using the first pick method, the controller determines if the main gas valve is open, and when the controller determines that the main gas valve is not open, attempts to pick the main gas valve from the closed position to the open position using a second pick method different than the first pick method.

Another aspect of the disclosure is a method of controlling a gas powered water heater to produce hot water in a storage tank by burning gas at a main burner. The method includes attempting, by a controller and in response to a determination by the controller to ignite the main burner, to pick a main gas valve of the main burner from a closed position to an open position using a first pick method. The first pick method includes closing a switch of a valve pick system to couple a capacitor of the valve pick system to the main gas valve for a first length of time to discharge energy stored in the capacitor to the main gas valve to pick the main gas valve, and opening the switch of the valve pick system after the energy stored in the capacitor is discharged to the main gas valve. The controller determines if the main gas valve is open after attempting to pick the main gas valve using the first pick method. When the controller determines that the main gas valve is not open, the controller attempts to pick the main gas valve from the closed position to the open position using a second pick method different than the first pick method.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1:
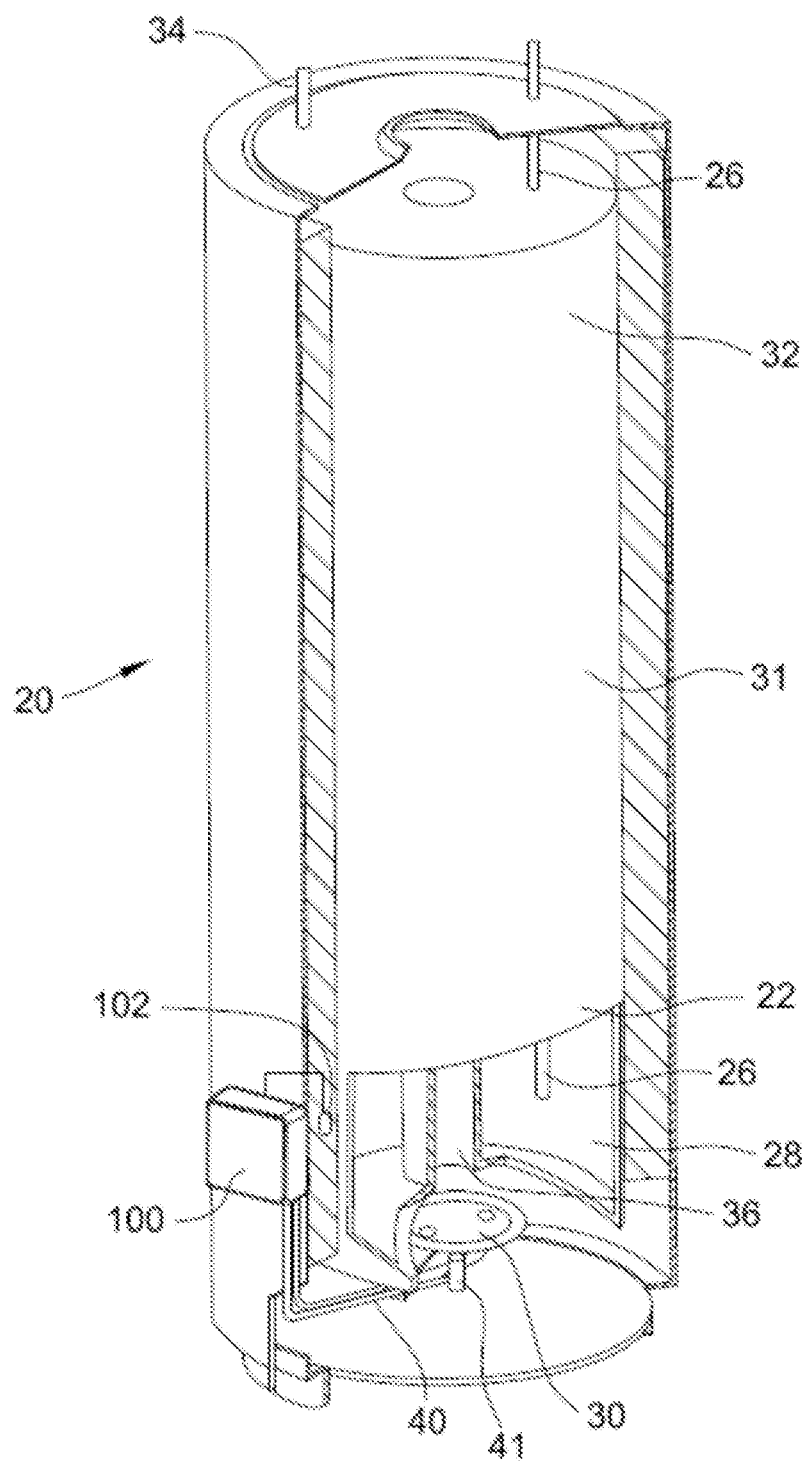
FIG. 1 is a cut-away view of a water heater including one embodiment of a control system for controlling operation of the water heater.

Referring initially to FIG. 1, a control system 100 is provided for controlling operation of a water heater 20 to maintain a setpoint temperature of water in the water heater 20. The water heater 20 has a storage tank 22 that stores heated water and receives cold water via a cold water inlet 26. Cold water entering a bottom portion 28 of the storage tank 22 is heated by a fuel-fired main burner 30 beneath the storage tank 22. Water leaves the storage tank 22 via a hot water outlet pipe 34. Combustion gases from the main burner 30 leave the water heater 20 via a flue 36. The control system 100 provides for control of gas flow via a gas supply line 40 and one or more valves (not shown) to the main burner 30, as described herein. The gas burned by the water heater 20 may be natural gas, liquid propane (LP) gas, or any other suitable gas for powering a water heater. Moreover, the control system 100 controls a standing (i.e., continuously lit) pilot burner 41 that operates as an ignition source for the main burner 30. The control system 100 also controls gas flow via gas supply line 40 and one or more valves (not shown in FIG. 1) to the pilot burner 41. Alternatively, the ignition source may be a piezoelectric lighter or any other suitable ignition source. In some embodiments, a piezoelectric lighter is used to ignite the pilot burner 41.

The control system 100 includes a sensor 102 that provides an output or value that is indicative of a sensed temperature of the water inside of the storage tank 22. For example, the sensor 102 may be a tank surface-mounted temperature sensor, such as a thermistor. Alternatively, in other embodiments, the sensor 102 may be a temperature probe or any other sensor suitable for measuring the water temperature in storage tank 22. In the embodiment shown in FIG. 1, sensor 102 is positioned proximate bottom portion 28 of the storage tank 22. Alternatively, the sensor 102 may be positioned to detect the temperature of the water in the storage tank 22 at any other suitable portion or portions of the storage tank, such as a middle portion 31, an upper portion 32, or a combination of bottom, middle, and/or upper portions. Moreover, the control system 100 may include more than one sensor 102. For example, the control system 100 may include two or more temperature sensors 102 for detecting the water temperature at one or more locations in the storage tank 22. In one example, the control system 100 includes two sensors 102 that are thermistors mounted on a circuit board positioned within a watertight tube near the bottom of the storage tank 22. The two thermistors detect the temperature of the water near the bottom portion 28 of the storage tank 22.

The control system 100 is positioned, for example, adjacent the storage tank 22. Alternatively, the control system 100 is located underneath the storage tank 22, in a watertight compartment within the storage tank 22, or in any other suitable location. Sensor 102 is in communication with control system 100, and provides control system 100 an output or value indicative of the water temperature in storage tank 22. In some embodiments, a second sensor (not shown) may be disposed at an upper portion 32 of the water heater 20, to provide an output or value that is indicative of a sensed temperature of the water in upper portion 32 of storage tank 22.

Various embodiments of the control system 100 may include and/or be embodied in a computing device. The computing device may include, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by a processor, cause the processor to perform at least a portion of the methods described herein.

Figure 2:
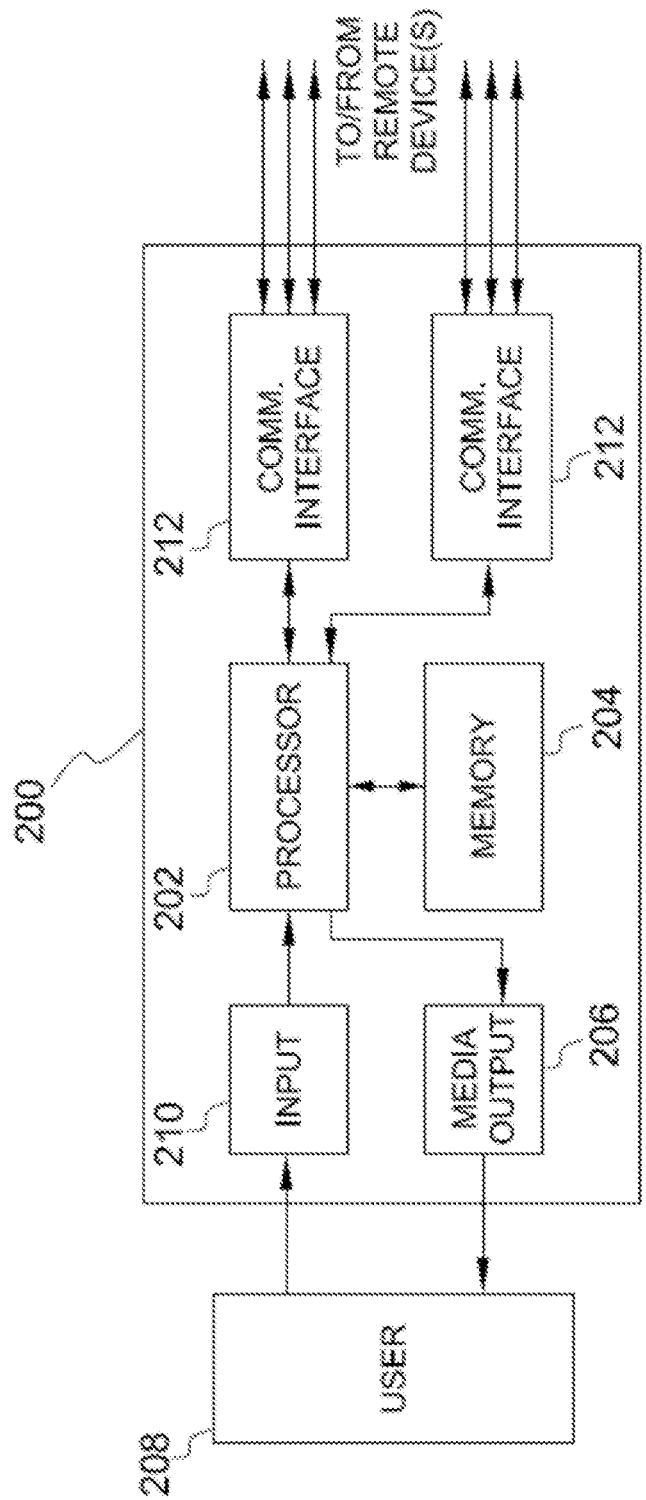
FIG. 2 is a block diagram of a computing device for use in the water heater shown in FIG. 1.

FIG. 2 is an example configuration of a computing device 200 for use as a controller in the control system 100. The computing device 200 includes a processor 202, a memory area 204, a media output component 206, an input device 210, and communications interfaces 212. Other embodiments include different components, additional components, and/or do not include all components shown in FIG. 2.

The processor 202 is configured for executing instructions. In some embodiments, executable instructions are stored in the memory area 204. The processor 202 may include one or more processing units (e.g., in a multi-core configuration). The memory area 204 is any device allowing information such as executable instructions and/or other data to be stored and retrieved. The memory area 204 may include one or more computer-readable media.

The media output component 206 is configured for presenting information to user 208. The media output component 206 is any component capable of conveying information to the user 208. In some embodiments, the media output component 206 includes an output adapter such as a video adapter and/or an audio adapter. The output adapter is operatively connected to the processor 202 and operatively connectable to an output device such as a display device (e.g., a liquid crystal display (LCD), organic light emitting diode (OLED) display, cathode ray tube (CRT), or "electronic ink" display) or an audio output device (e.g., a speaker or headphones).

The computing device 200 includes, or is connected to, the input device 210 for receiving input from the user 208. The input device is any device that permits the computing device 200 to receive analog and/or digital commands, instructions, or other inputs from the user 208, including visual, audio, touch, button presses, stylus taps, etc. The input device 210 may include, for example, a variable resistor, an input dial, a keyboard/keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 206 and the input device 210.

The communication interfaces 212 enable the computing device 200 to communicate with remote devices and systems, such as sensors, valve control systems, safety systems, remote computing devices, and the like. The communication interfaces 212 may be wired or wireless communications interfaces that permit the computing device to communicate with the remote devices and systems directly or via a network. Wireless communication interfaces 212 may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces 212 may use any suitable wired communication protocol for direct communication including, without limitation, USB, RS232, I2C, SPI, analog, and proprietary I/O protocols. In some embodiments, the wired communication interfaces 212 include a wired network adapter allowing the computing device to be coupled to a network, such as the Internet, a local area network (LAN), a wide area network (WAN), a mesh network, and/or any other network to communicate with remote devices and systems via the network.

The memory area 204 stores computer-readable instructions for control of the water heater 20 as described herein. In some embodiments, the memory area stores computer-readable instructions for providing a user interface to the user 208 via media output component 206 and, receiving and processing input from input device 210. The memory area 204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 3:
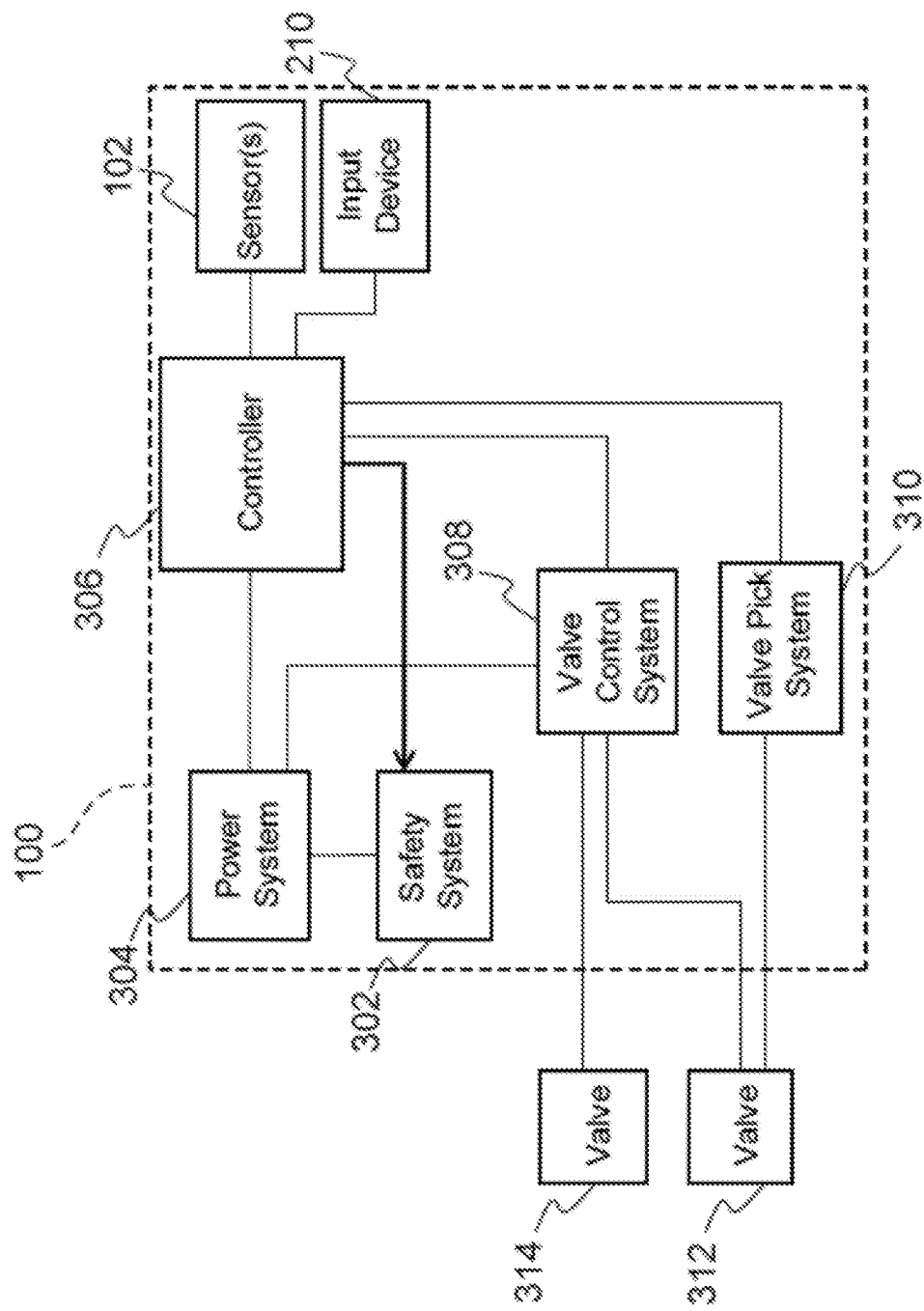
FIG. 3 is a schematic block diagram of the control system shown in FIG. 1.
Figure 4:
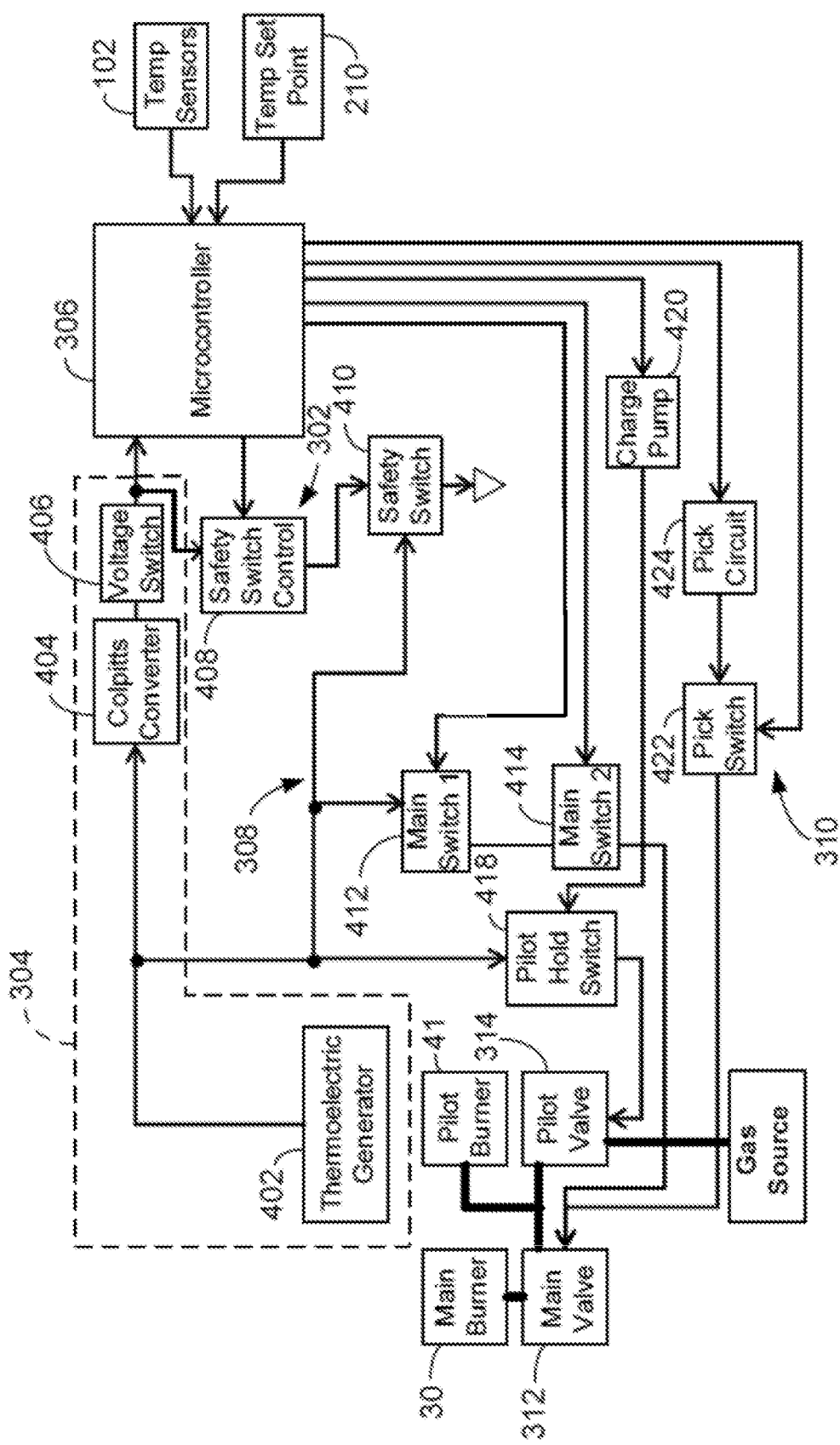
FIG. 4 is a schematic block diagram of an embodiment of the control system shown in FIG. 3.
Figure 5A:
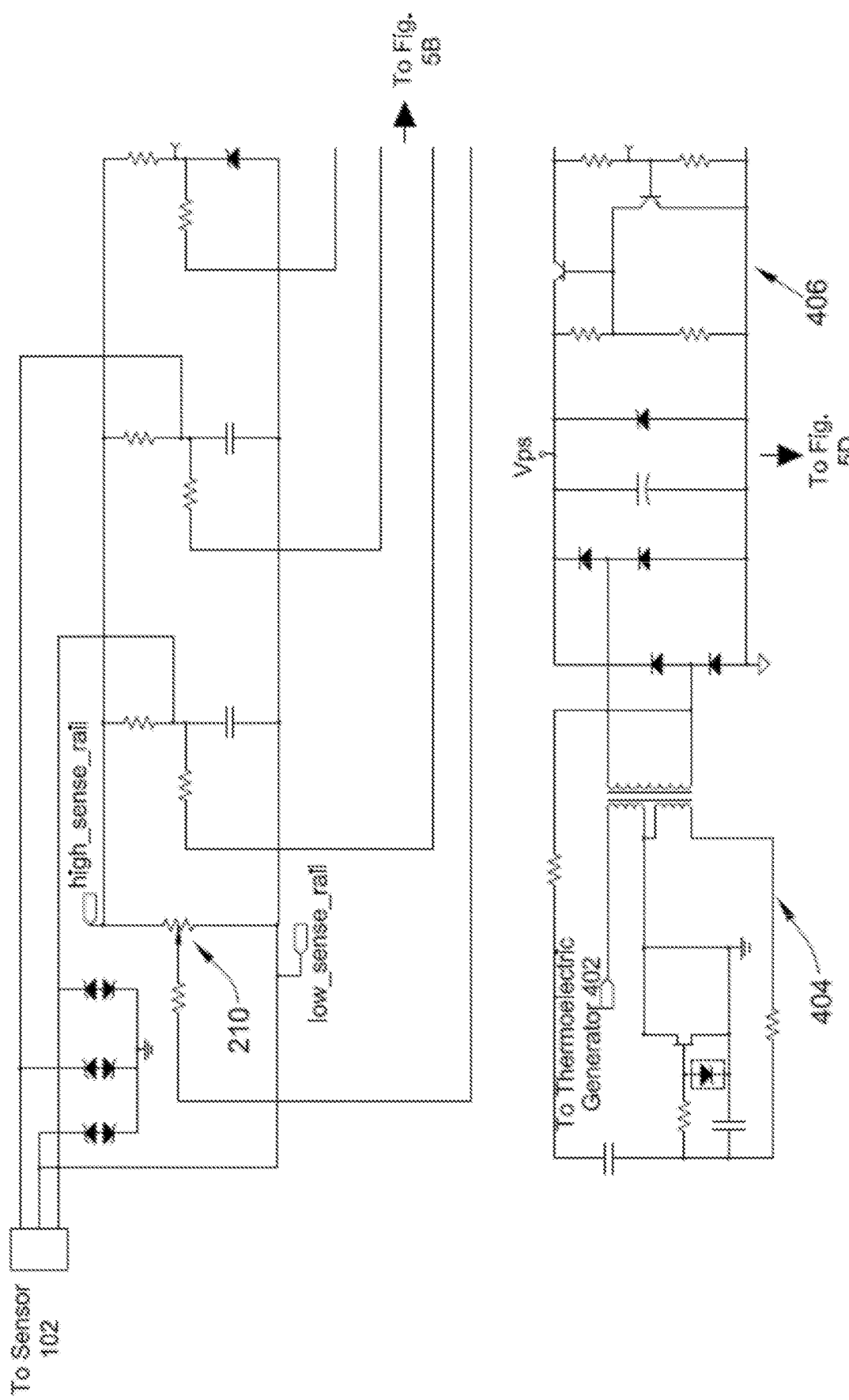
FIGS. 5A-5D are portions of a circuit diagram of an embodiment of the control system shown in FIG. 3.
Figure 5B:
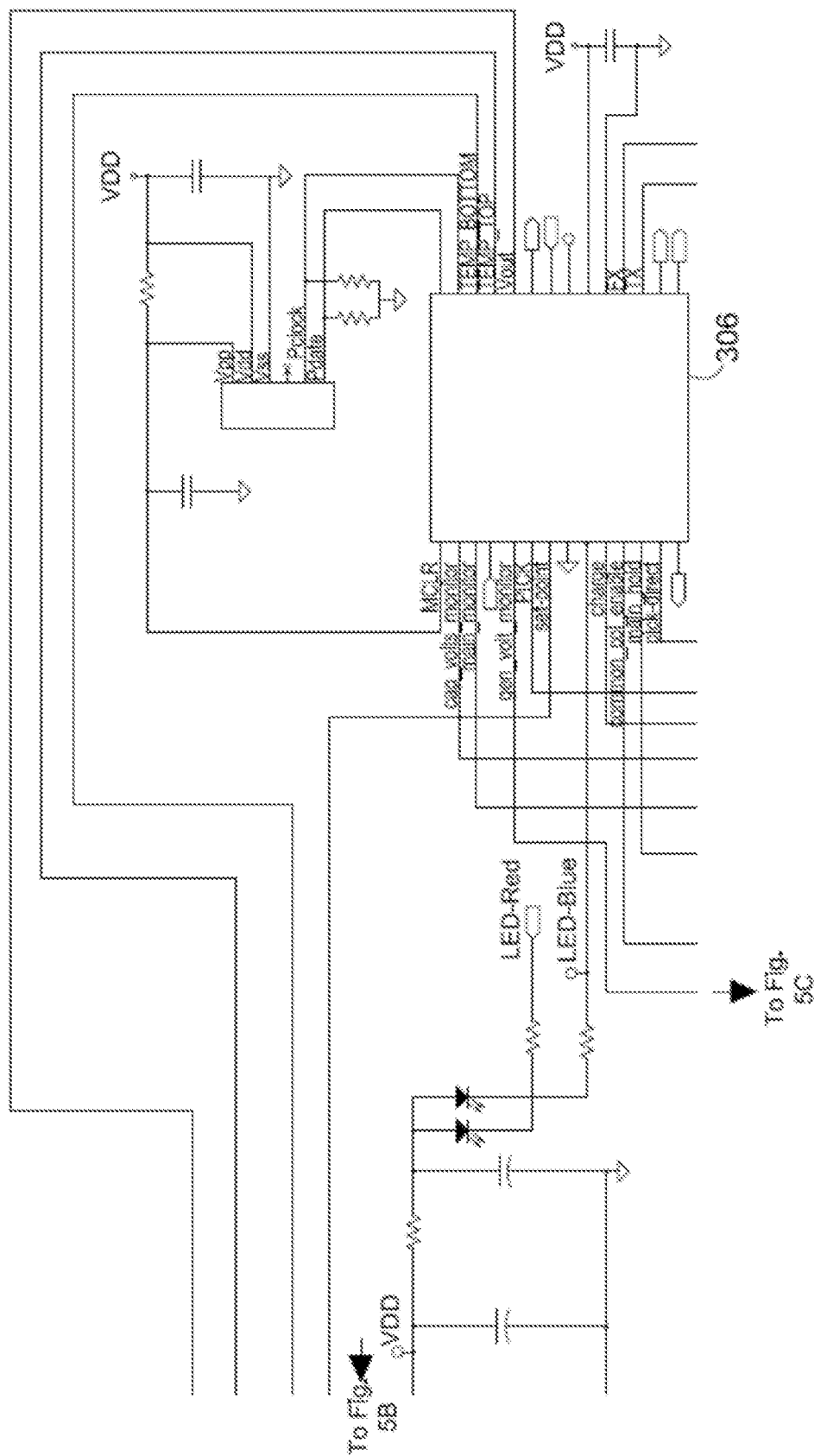
Figure 5C:
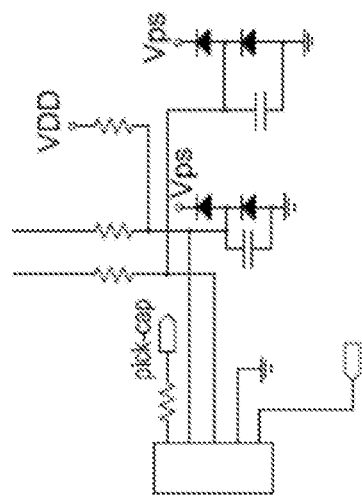
Figure 5C:
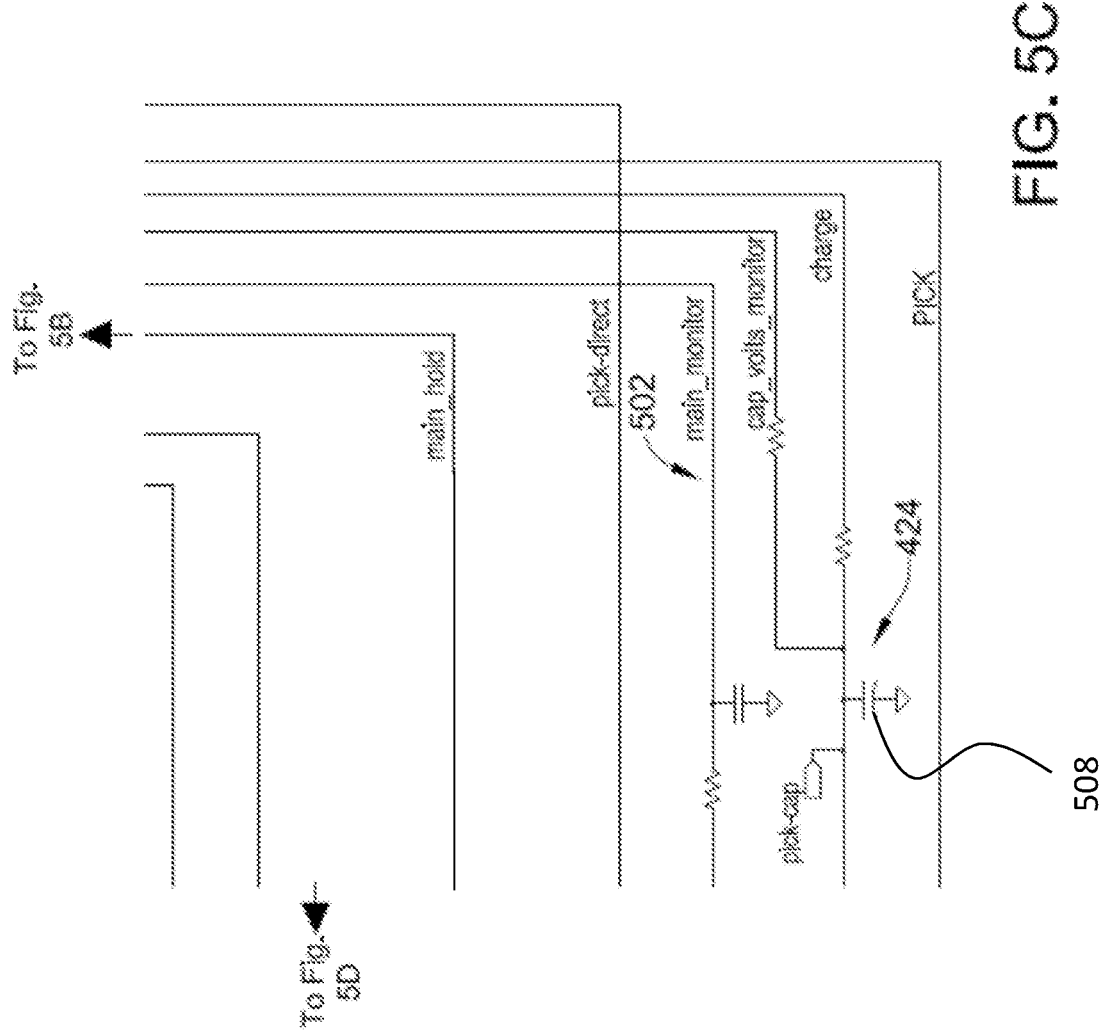
Figure 5D:
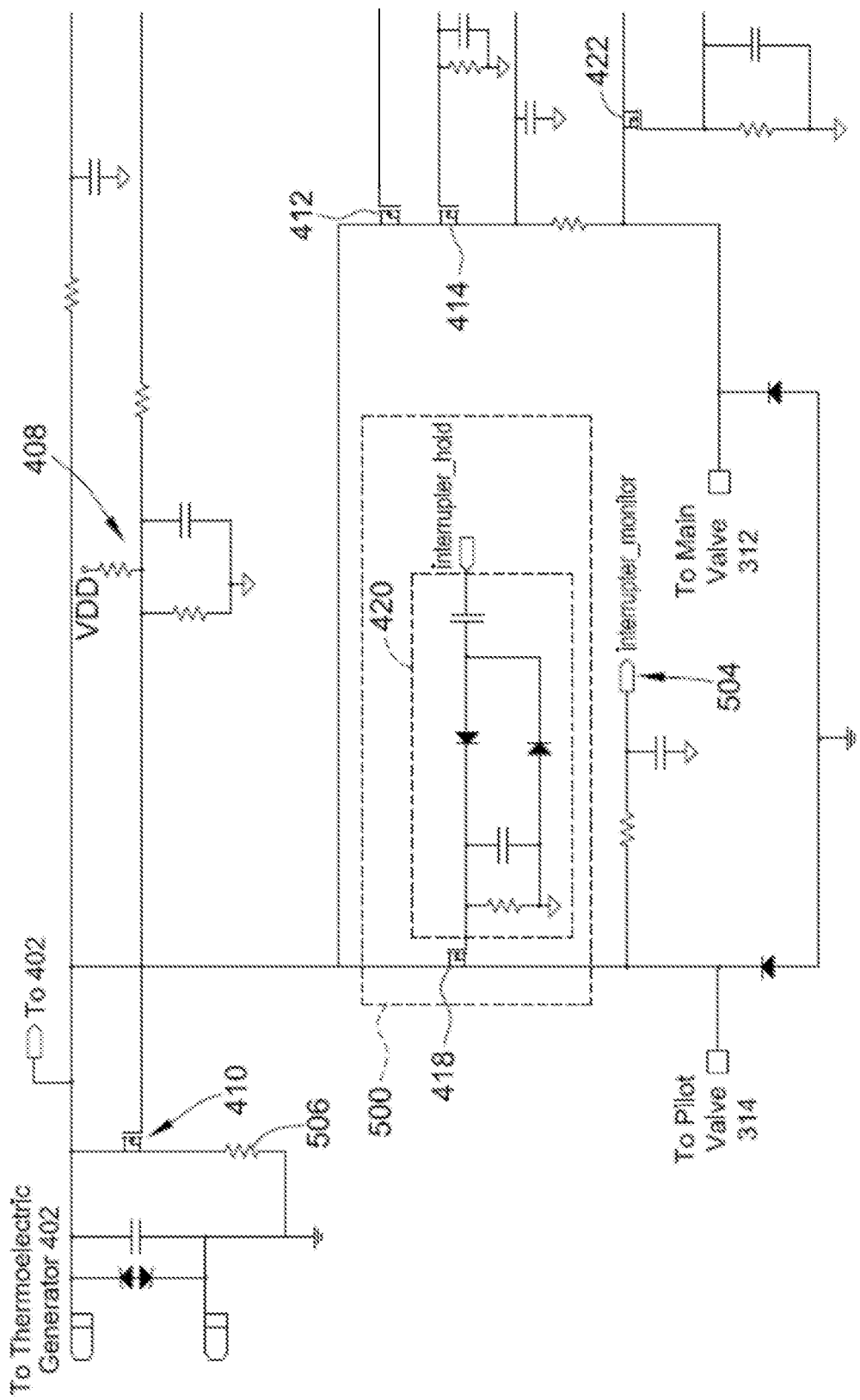

A functional block diagram of the control system 100 is shown in FIG. 3. The control system includes a safety system 302, a power system 304, a controller 306, sensors 102, a valve control system 308, and a valve picking system 310. The control system is coupled to and controls a first valve 314 and a second valve 312. The second valve 312 and the first valve 314 are solenoid actuated gas valves for selectively coupling gas to the main burner 30 and the pilot burner 41, respectively. The second valve is sometimes referred to herein as a "main valve" or a "main gas valve." The first valve is sometimes referred to herein as a "pilot valve" or a "pilot gas valve." An electrical current through the coil of the valve 312 or 314 causes the valve 312 or 314 to open. As shown in FIG. 4, gas flows from a gas source to first valve 314. Gas that passes through the first valve 314 is provided to the pilot burner 41 and the second valve 312. Gas passing through the second valve 312 is provided to the main burner 30.

With reference again to FIG. 3, the power system 304 provides power to the other components of the control system 100. Specifically, the power system 304 provides power to the controller 306 and the valve control system 308. The power system 304 provides an output to the valve control system 308 at a first voltage that is lower than a second voltage output to the controller 306. The power system 304 may include and/or receive power from any suitable alternating current (AC) or direct current (DC) power source, such as one or more batteries, thermoelectric generators, photovoltaic cells, AC utilities, and the like. In an embodiment, the power system includes an unregulated DC power source (not shown in FIG. 3) with a source resistance between about two and five ohms. In some embodiments, the unregulated DC power source is a thermoelectric generator in thermal communication with the pilot burner 41. The thermoelectric generator can be ideally represented by a 650-850 mV Thevenin equivalent voltage source with a 2 to 5 ohm Thevenin equivalent source resistance.

The safety system 302 is configured to selectively extinguish and/or prevent ignition of the main burner 30 and/or the pilot burner 41. Specifically, the safety system 302, under the direction of the controller 306, prevents the power system from providing sufficient voltage, current, and/or power to hold open the first valve 314 or the second valve 312. When the valves 312 and 314 are closed, gas flow to the main burner 30 and the pilot burner 41 is prevented and ignition of the main burner 30 and the pilot burner 41 is thereby prevented. When the controller 306 determines to shut down the water heater 20 using the safety system 302, the controller 306 outputs a signal to safety system 302. In response to the signal, the safety system 302 causes the valves 312 and 314 to close (if open) and prevents them from being opened (if already closed). In other embodiments, the safety system 302 operates in response to a lack of an expected signal from the controller 306. Thus, if the controller does not send (or the safety system 302 otherwise does not receive) the expected signal, whether continuously or periodically, the safety system 302 causes the valves 312 and 314 to close.

Responsive to signals from the controller 306, the valve control system 308 selectively couples power from the power system 304 to the valves 312 and 314 to selectively hold them open. The valve control system 308 is responsive to signals from the controller 306 to couple power to one of the valves 312 or 314 and to signals that instruct it to decouple the valve 312 or 314 from the power system 304. Moreover, when the valve control system is holding one of the valves 312 or 314 open, the valve control system 308 ceases coupling power to the valves 312 and 314 if it does not receive an expected signal from the controller 306. Thus, if the controller 306 stops sending the expected signal (or sends an incorrect signal) the valve control system decouples the valve(s) 312 and/or 314 from the power system 304, thereby causing the valves 312 and/or 314 to close. The expected signal may be a continuous signal, a signal repeated at a particular interval, a signal with a particular duty cycle or frequency, or any other suitable signal.

The valve pick system 310 receives power at the second voltage from the controller 306 and opens (also sometimes referred to as "picking" or "picking open") the main valve 312 when commanded to do so by the controller 306. The valve pick system 310 does not open the pilot valve 314. The pilot valve 314, in this embodiment, is a manually opened valve, which may be held open by the valve control system 308 after it is manually opened. Alternatively, the valve pick system 310 may also be operable to pick the pilot valve 314.

The sensors 102 are temperature sensors operable to provide a signal indicative of the temperature the water in the storage tank 22. The sensors 102 provide their signals to the controller 306. As described above, the sensors 102 are any suitable sensor, such as thermistors, probes, and the like, for detecting the temperature of the water within the storage tank. Additionally, or alternatively, the sensors 102 may include any other suitable types of sensors, such as oxygen sensors, ambient air temperature sensors, moisture sensors, etc.

The controller 306 controls operation of the water heater 20 and the control system 100. The controller 306 operates the water heater to provide water heated to a desired temperature, such as a temperature setpoint that is set by a user via the input 210. The controller 306 includes a computing device, such as computing device 200. In some embodiments, the controller 306 is a microcontroller. Alternatively, the controller 306 includes any combination of digital and/or analog circuitry that permits the controller 306 to function as described herein.

In general, the controller 306 controls the water heater 20 based on the inputs from the sensors 102 and the temperature setpoint. Under normal operations, the controller 306 utilizes the valve control system 308 to hold open the pilot valve 314 to permit gas to flow to the pilot burner 41 and the main valve 312 When the water temperature detected by the sensors 102 drops below the a threshold slightly below the temperature setpoint, the controller 306 determines to ignite the main burner 30 and opens the main valve 312 using the valve pick system 310. After the main valve 312 is picked open, the controller 306 holds the main valve open by coupling power from the power system 304 to the main valve 312 through the valve control system 308. When the controller 306 determines, based on the temperature set point and the input from the temperature sensors 102, to turn off the main burner 30, it decouples the main valve 312 from the power system 304 to close the main valve 312, thereby interrupting the flow of gas to the main burner 30 and extinguishing the main burner 30. If an abnormal condition occurs at any point during operation, the safety system prevents the power system 304 from opening and/or holding open the valves 312 and 314.

As will be described in more detail below, after attempting to open the main valve 312 using the valve pick system and a first pick method, the controller 306 determines if the main valve 312 was successfully opened, and if the main valve 312 was not successfully opened, attempts to open the main valve 312 using a second pick method than the first pick method used in the previous attempt. In some embodiments, the controller 306 repeatedly attempts to open the main valve 312 using the first and second pick methods on alternate attempts until the controller 306 determines that the main valve 312 has been opened.

FIG. 4 is a block diagram of an example embodiment of the control system 100 shown in FIG. 3. FIGS. 5A-5D show portions of a circuit diagram of one implementation of the control system 100 shown in FIG. 4. Particular components as shown in FIGS. 5A-5D produce the voltage values and timings described herein. It should be understood that different components with the same or different characteristics and/or values may be used in other implementations.

The power system 304 includes a thermoelectric generator 402, a power converter 404, and a voltage switch 406. The thermoelectric generator 402 is thermally coupled to the pilot burner 41. The thermoelectric generator 402 provides a direct current (DC) electrical output (voltage V1) in response to a flame on the pilot burner 41. Although the output voltage V1 will vary based on load, temperature, and other factors, under steady state conditions the voltage V1 will be around 450 mV. The output of the thermoelectric generator 402 is input to the power converter 404. The power converter 404 is a modified Colpitts oscillator that is self-starting and self-oscillating. The converter 404 automatically begins operating in response to the electrical output from the thermoelectric generator 402. The power converter 404 produces a DC output with a voltage (V2) greater than its input voltage V1. In an example embodiment, the maximum value of voltage V2 output by the converter 404 varies between about seventeen times V1 to about ten times V1 depending on the magnitude of the voltage V1 input to the converter 404. In other embodiments, the maximum voltage V2 may have any other suitable relationship or range of relationships to the voltage V1. At steady state, the converter 404 will provide an output voltage of approximately 5 volts. When the voltage V2 is coupled to the controller 306, the controller 306 turns on and begins controlling operation of the water heater 20.

The control system 100 includes a flame loss feedback safety feature. The thermoelectric generator's thermal communication with the pilot burner 41 produces the current to hold open the pilot valve 314. If the flame on the pilot burner 41 is lost, the output voltage from the thermoelectric generator 402 will decrease until there is insufficient current to hold open the pilot valve 314. Because gas flows through the pilot valve 314 to the main valve 312 (and the main burner 30), the loss of flame on the pilot burner 41 causes the pilot valve 314 to close and interrupt gas flow to both the pilot burner 41 and the main burner 30. This may help prevent gas from being delivered to the pilot burner 41 or the main burner 30 when there is no ignition source available for the gas.

The voltage switch 406 is located between the converter 404 and the controller 306. The voltage switch 406 defaults to an OFF (non-conducting) state and turns ON when its supply voltage (i.e., the output of converter 404) reaches a first threshold. The voltage switch 406 also turns OFF if its supply voltage falls below a second, lower threshold. The voltage switch 406 selectively connects the voltage V2 to the controller 306 to power the controller 306. At startup, the thermoelectric generator 402 output V1 will be zero and it will ramp toward its steady value over several minutes. When voltage V1 reaches approximately 50-100 mV, the power converter 404 will turn on and its output voltage V2 will begin ramping toward its steady state value of 5V. The ramp to 5V can take 30-60 seconds depending on the V1 ramp rate. When the converter 404 output voltage V2 reaches the first threshold, the voltage switch 406 turns ON and the power supply voltage of the controller 306 will immediately rise to a voltage substantially equal to the first threshold. The voltage output from the voltage switch 406 will be slightly less than the voltage V2 because there is a small voltage drop across the voltage switch 406. The voltage drop depends on the particular device used for the voltage switch 406 and the ambient temperature. In an example embodiment, the voltage drop is between about 0.1 volts and 0.2 volts. This provides a "hard-edge" to the controller 306 power supply pin and other systems that use the controller 306 power supply voltage. The voltage switch 406 also provides a reference for software timings as the software can assume the supply voltage of the controller 306 is roughly equal to the first threshold at the start of code execution. The voltage switch 406 includes hysteresis so that it will not turn OFF if the voltage V2 falls back below the first threshold value. The OFF threshold for the voltage switch 406 is set to a second, lower threshold value that is below the brown-out voltage for the controller 306. In the example embodiment, the first threshold value is about 3.5 volts, the brownout voltage of the controller 306 is about 1.8 volts, and the second threshold value is less than 1 volt. If V2 drops below 1.8V, the controller 306 will brown-out before the voltage switch 406 turns off. Alternatively, the second threshold may be a value that is not below the brown-out voltage of the controller 306. For example, the second threshold voltage may be set at 2.5V. The voltage V2 could then vary between 5 volts and 2.5 volts without the voltage switch 406 turning off. Because the second threshold is above the brownout voltage, the voltage switch 406 will be turned off by a decreasing voltage V2 before the brownout voltage of the controller 306 is reached.

The safety system 302 includes a safety switch control circuit 408 and a safety switch 410. In the illustrated embodiment, the safety switch control circuit 408 is coupled to the output of the voltage switch 406, the safety switch 410, and a control pin of the controller 306. The safety switch 410 is also coupled between the output of the thermoelectric generator 402 and ground. In the example embodiment, at startup, the pin of the controller 306 that is coupled to the safety switch control circuit 408 is held in a high impedance (Hi-Z) state. The safety switch control circuit 408 includes a timing circuit, e.g., an RC circuit defining an RC time constant, that is enabled by placing the controller 306 pin in the Hi-Z state. When the voltage switch 406 turns on, the safety switch control circuit 408 will slowly charge toward the voltage V2. If the voltage of the safety switch control circuit 408 reaches a threshold value, the safety switch control voltage will cause the safety switch 410 to turn on. When the safety switch 410 is turned on, the thermoelectric generator output is substantially shorted to ground and there is insufficient power available to hold open the main valve 312, hold open the pilot valve 314, operate the converter 404, and operate the controller 306. If the pin of the controller 306 that is coupled to the safety switch control circuit 408 is switched to a logical low state before the safety switch control circuit 408 reaches the threshold value, the timing circuit is disabled and the safety switch 410 does not turn on. Alternatively, the safety switch control circuit 408 may not be coupled to the voltage switch 406 and the pin of the controller 306 that is coupled to the safety switch control circuit 408 is not held in a Hi-Z state at startup. In such embodiments, the pin of the controller 306 coupled to the safety switch control circuit 408 is driven high or low to turn the safety switch 410 on or off.

The thermoelectric generator 402 is an unregulated DC power source that can be represented by a 650 mV to 850 mV Thevenin equivalent voltage source with a 2 to 5 ohm source resistance at optimal steady state. The Thevenin equivalent voltage generally decreases as ambient temperature around the thermoelectric generator 402 increases, such as after the main burner 30 has been on for a long time. Because of the thermoelectric generator 402 power supply characteristics, the size of its load (in ohms) will determine the voltage over the load. Substantially lowering the overall load on the thermoelectric generator 402, by switching in a parallel low resistance load (e.g., resistor 506 shown in FIG. 5D) or shorting directly to ground (e.g., resistor 506 is substantially 0 ohms) via the safety switch 410, substantially lowers the voltage (V1) because of the voltage divider created with the source resistance and the new lower overall load. The safety switch 410 load is sized so that when it is switched on it will lower the voltage V1 below the voltage required to hold open the valves 312 and 314 and below the voltage required to start the converter 404. Moreover, the size of the safety switch load (and its presence or absence) is determined according to the source impedance of the power source. If the source impedance of the power source is relatively low, the safety switch load should be greater than 0 ohms to limit the current and drop the output voltage substantially across the safety switch load. In the example embodiment, the safety switch 410 load is sized to drop the load resistance to about 0.24 ohms and the voltage V1 drops to about 40 mV. Alternatively, because the thermoelectric generator 402 has a relatively high source impedance, the safety switch 410 couples the output of the thermoelectric generator 402 directly to ground without inclusion of a parallel low resistance load. In one example, the safety switch 410 load is sized to drop the load resistance to about 0 ohms and the voltage V1 to between about 10 mV and about 15 mV.

In normal startup operation, the controller 306 will change the output of its safety switch control pin to a low state within a preset amount of time, preventing the voltage of the safety switch control circuit 408 from reaching the threshold to turn on the safety switch 410. The controller 306 changes the output of the safety switch pin to a low state after the controller 306 passes all internal microprocessor and hardware checks (internal microprocessor checks can take from 4 to 6 seconds after the voltage switch 406 turns on and the controller 306 begins executing instructions). In embodiments in which the safety switch control circuit 408 is not coupled to the voltage switch 406, the safety switch control pin begins in the low state during normal startup operations. During normal operation of the water heater 20, the controller 306 will maintain the output pin coupled to the safety switch control circuit 408 in a low state, thus keeping the voltage of the safety switch control circuit 408 from reaching the threshold to turn on the safety switch 410. If the controller 306 determines to shut the valves 312 and 314 of the water heater 20 for safety reasons, the controller 306 switches the safety circuit output pin to a high state. When the output pin is high, the safety switch circuit 408 charges to the threshold to turn on the safety switch 410 at a rate that is faster than the rate when the pin is in the Hi-Z state.

In some embodiments, the controller also sets the safety switch enable pin to a high impedance state (thus allowing the safety switch control voltage to charge) before providing signals to hold open the valves 312 and 314. The safety switch enable pin is then driven low once the signals are completed. In this way if the controller 306 malfunctions and becomes stuck in the state when signaling to the valves is ON, the safety switch 410 will eventually charge and shut the system down.

The valve control system 308 includes a first main switch 412, a second main switch 414, a pilot switch 418, and a pilot charge pump 420. As described above, the controller 306 selectively holds open the main valve 312 and the pilot valve 314 via the valve control system 308, which may also be referred to as a valve holding system. The controller 306 holds the pilot valve 314 open by closing the pilot switch 418 to couple the pilot valve 314 to the thermoelectric generator 402 output. Specifically, the controller 306 supplies periodic bursts of pulse width modulated (PWM) signals to the pilot charge pump 420. The PWM signals are square waves with an amplitude that switches from 0 volts to substantially the voltage V2. The burst of PWM signals charge the pilot charge pump 420 to a voltage V3 sufficient to turn on the pilot switch 418. In the embodiment, the voltage V3 is less than the voltage V2. The magnitude of the voltage V3 will vary with the varying of voltages V1 and V2. When the voltage V2 is about 5 volts, the example voltage V3 will be about 3 volts. In other embodiments, the voltage V3 may be the same as or greater than the voltage V2 depending on the voltage needed to turn on the pilot switch 418. In one embodiment, V3 is about 3.25 volts. The controller 306 periodically provides PWM signal bursts to maintain the output of the charge pump at about V3. If the controller 306 ceases providing the PWM signal bursts or delays too long before providing a burst, the charge pump will not output a voltage V3 sufficient to turn on the pilot switch 418. The pilot switch 418 will turn off (or stay off), the pilot valve 314 will be closed, the pilot burner 41 will not receive gas through the pilot valve 314, and the pilot burner 41 will be extinguished.

The valve pick system 310 includes a pick switch 422 and a pick circuit 424. The pick circuit 424, the pick switch 422, and both main valve switches 412 and 414 are used for picking open the main valve 312. The controller 306 outputs the voltage V2 to the pick circuit 424 to charge a pick capacitor 508 (shown in FIG. 5C) to, ideally, the voltage V2. More practically, the pick capacitor 508 may be charged to a voltage that is slightly less than V2. The pick capacitor 508 will take time to charge. The controller 306 monitors the voltage of the pick capacitor. When the pick capacitor 508 is charged to a voltage greater than a picking threshold voltage, the controller 306 may pick open the main valve 312. The picking threshold voltage is less than the voltage V2, but more than the minimum voltage needed to open the main valve 312. In one example, the minimum voltage needed to open the main valve 312 is between about 1.7 volts and 2.0 volts, and the picking threshold voltage is about 3 volts. In other embodiments, the picking threshold voltage is a voltage between about 1V and 5V. Alternatively, the picking threshold voltage may be any voltage greater than the minimum voltage sufficient to open the main valve 312. Thus, the output of the pick circuit 424 may be any voltage between about 3 volts and about 5 volts. To pick the main valve, the controller 306 sends a signal (e.g., provides a high output on the pin connected to the first main switch 412) to turn on the first main switch 412. The second main switch 414 is initially off. After the first main switch 412 is turned on, the controller 306 turns the pin connected to the pick switch 422 to a high output in order to close the pick switch 422. The energy stored in the pick capacitor 508 is coupled to the main valve 312 through the pick switch 422 and the main valve 312 opens.

Figure 6:
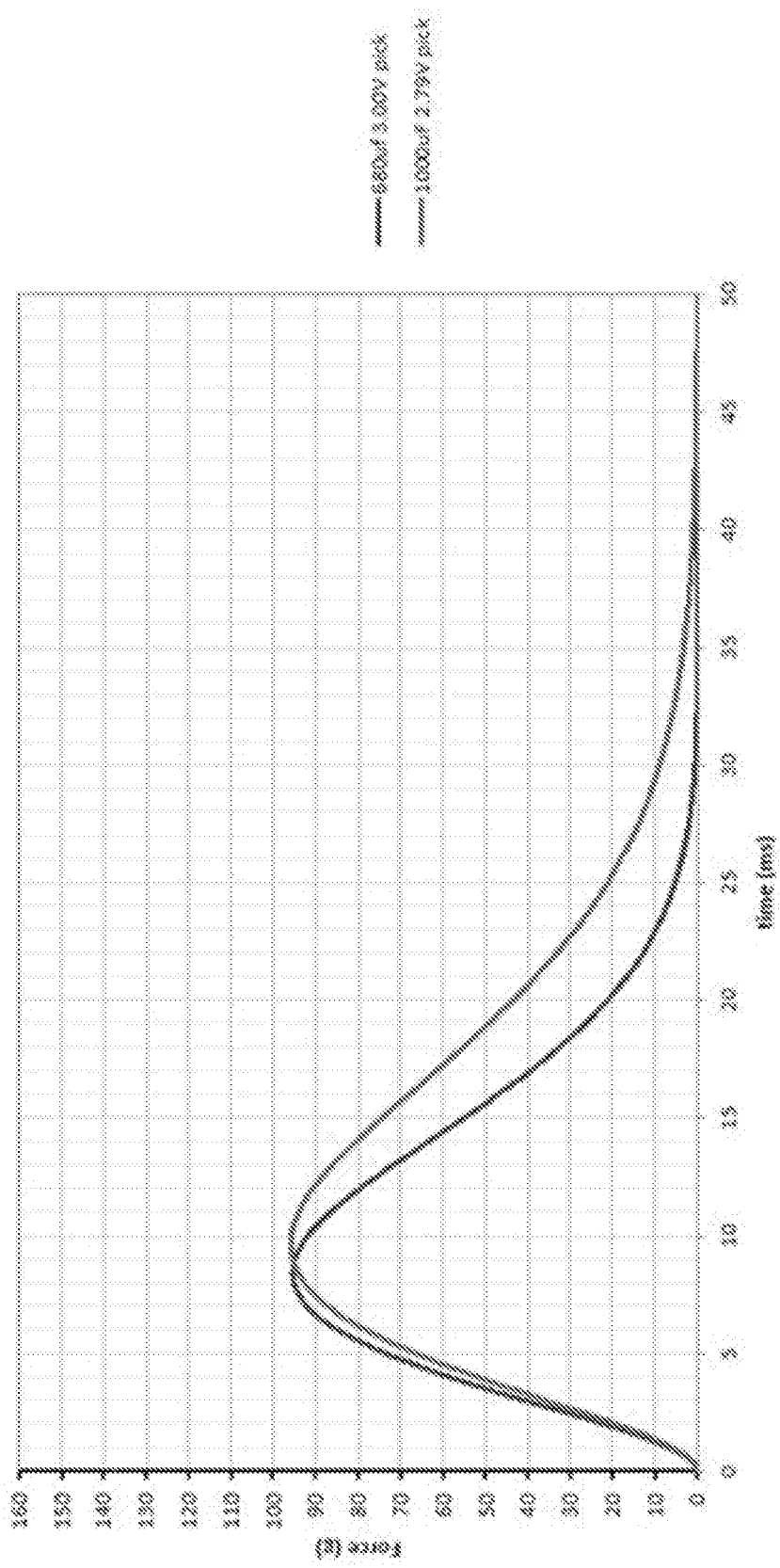
FIG. 6 is a graph of the force generated on a main valve as a function of time when using a first pick method.

In the example embodiment, the pick capacitor 508 is a 1000 μF capacitor charged to about 2.79 volts. In another embodiment, the pick capacitor is a 680 μF capacitor charged to about 3.0 volts. FIG. 6 is a graph of the force generated on the main valve 312 as a function of time for both embodiments. As can be seen, both capacitors produce about the same peak force on the main valve 312, but the 1000 μF capacitor takes longer to reach the peak force and takes longer to fully discharge. Other embodiments may include pick capacitors having different capacities and/or charged to different voltages.

The second main switch 414 is closed briefly before the pick switch 422 is opened. Closing the second main switch 414 couples the thermoelectric generator 402 voltage V1 to the main valve 312 through the first and second main switches 412 and 414 to hold the main valve 312 open so the main burner 30 remains lit. To keep the main burner 30 lit, the controller 306 keeps the main switches 412 and 414 on by maintaining the output pins coupled to the first main switch 412 and the second main switch 414 high. To turn off the main burner 30, the controller 306 opens both main switches 412 and 414, thereby interrupting the connection between the main valve 312 and the thermoelectric generator 402.

The second main switch 414 is used in both picking and holding open the main valve 312 and can be considered part of both the valve pick system 310 and the valve control system 308. The second main switch 414 ensures that substantially all of the picking voltage is directed from the pick circuit 424 to the main valve 312. The first main switch 412 and the second main switch 414 are MOSFETS with internal body diodes. The first main switch 412 has an internal body diode with its cathode pointed toward the thermoelectric generator 402. The second main switch 414 has its body diode with the cathode pointed toward the main valve 312 (and away from the first main switch 412). Without the second main switch 414, when the pick switch 422 is turned ON, the pick voltage would appear on the main valve 312 and simultaneously on the first main switch 412. Even with the first main switch 412 turned off, the 3 to 5V pick spike may be sufficient to forward bias the internal body diode of first main switch 412, allowing current to flow through the first main switch 412 to discharge through the thermoelectric generator 402 source resistance to ground. This discharge through the thermoelectric generator 402 could have an adverse effect on the thermoelectric generator 402 and it is a loss of power that could be used for picking the main valve 312. The second main switch 414, however, has its internal body diode oriented opposite of the first main switch 412. When the second main switch 414 is off, the pick voltage reverse biases the internal body diode of the second main switch 414, preventing the flow of current to the thermoelectric generator 402 and permitting substantially all of the pick current to travel to the main valve 312. Alternatively, the second main switch 414 may be eliminated and the first main switch 412 may be oriented as the second main switch 414, i.e., with its internal body diode's cathode pointed toward the main valve 312 and its anode toward the thermoelectric generator 402. In such an embodiment, the first main switch's body diode will be reverse biased by the pick voltage and substantially all of the pick current travels to the main valve 312.

When it is determined that picking of the main valve 312 will occur, first main switch 412 is turned on. The controller 306 will then go to sleep for 2 seconds to conserve power to let the voltage on the pick circuit capacitor 508 rise. Upon waking at t=0 ms, the controller 306 turns on the pick switch 422. The pick circuit capacitor's voltage will begin decaying and current begins flowing through the main coil of the main valve 312. As the current through the main coil increases the main valve 312 will eventually open. At a time between about t=20 ms and t=40 ms (depending on the main valve's specific coils and the size of the pick circuit capacitor 508) the voltage from the pick circuit capacitor 508 is close to zero. The second main switch 414 is turned on to couple the thermoelectric generator 402 output voltage to the main valve 312 to hold the valve 312 open. At t=40 ms, the pick switch 422 is turned off. Thus, the pick switch 422 is turned on for a first length of time (i.e., 40 ms in the example embodiment) to discharge the stored energy of the pick capacitor 508 to the main valve 312. Turning on the pick switch 422 for the first length of time to discharge the stored energy of the pick capacitor 508 to the main valve 312 is sometimes referred to herein as a first pick method.

After attempting to open the main valve 312, the controller 306 determines if the main valve is open. In the example embodiment, the controller determines if the main valve 312 is opened based on whether or not the water in the storage tank 22 is increasing in temperature. Specifically, the controller 306 determines if the temperature is increasing based on the temperature of the water in the storage tank as detected by one or more of the temperature sensors 102 to. If the temperature is not increasing (that is, if the signals from the temperature sensor indicate a current temperature that is not greater than a previous temperature), the controller 306 determines that the main valve 312 is not open and the main burner 30 is not lit. If the temperature is increasing (that is, the current temperature measurement is greater than a previous temperature measurement), the controller 306 determines that the main valve 312 is open and the main burner 30 is lit. Alternatively, signals from a different sensor, such as a flame detection sensor, a gas flow sensor, or a temperature sensor positioned near the main burner) may be used to determine if the main valve has been successfully opened.

When the controller 306 determines that the main valve is open, the controller 306 operates to hold the main valve 312 open as described above.

When the controller 306 determines that the main valve has not been opened, the controller 306 attempts to pick the main valve 312 from the closed position to the open position using a second pick method different than the first pick method. In the second pick method, the controller 306 rapidly closes and opens the pick switch 422 to alternately couple and decouple the pick capacitor 508 to/from the main valve 312. This alternate closing and opening may facilitate opening the main valve 312 when it is sticking in the closed position. In the example embodiment, the controller 306 closes and opens the pick switch 422 several times over a second length of time that is shorter than the first length of time. At the end of the second length of time, the controller 306 holds the pick switch 422 closed until the energy stored in the pick capacitor 508 is discharged to the main valve 312. In other embodiments, the controller 306 alternately closes and opens the pick switch 422 the entire time until the energy stored in the pick capacitor 508 is discharged to the main valve 312. In still other embodiments, the controller 306 initially closes the pick switch for length of time less than the first length of time and then alternately closes and opens the pick switch 422 until the energy stored in the pick capacitor 508 is discharged to the main valve 312.

Figure 7:
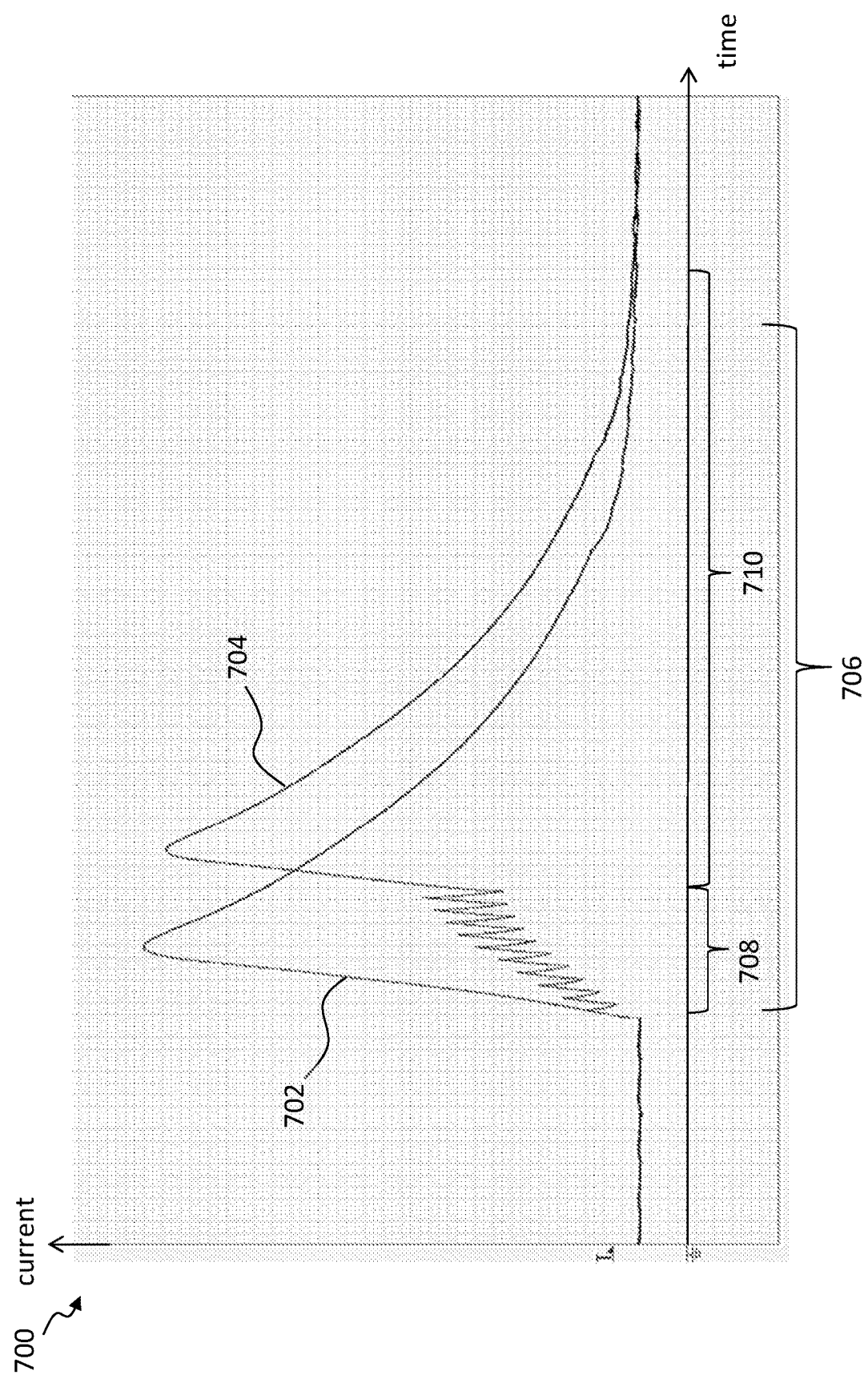
FIG. 7 is a graph comparing the current provided by the pick capacitor when using a first pick method and a second pick method.

FIG. 7 is a graph 700 comparing the current provided by the pick capacitor 508 when using the first pick method and the second pick method. Because the force produced by the current in the main valve 312 is proportional to the current, the graph 700 may also be considered a graph of the force produced by the two different pick methods. The trace 702 is the current produced using the first pick method, and the trace 704 is the current produced using the second pick method. Time period 706 corresponds to the first length of time that the pick switch 422 is closed during the first pick method. Time period 708 corresponds to the second time period of the second pick method during which the pick switch 422 is alternately closed and opened repeatedly, resulting in a saw tooth current. This period is followed in the second pick method by time period 710 during which the pick switch 422 is held closed. As can be seen, the first pick method produces a larger peak current, but discharges faster than the second pick method. In the example embodiment, the pick switch is turned on and off (i.e., closed and opened) ten times during the time period 708 before being held on for the time period 710. In other embodiments, the pick switch 422 may be turned on more or fewer times.

Figure 8:
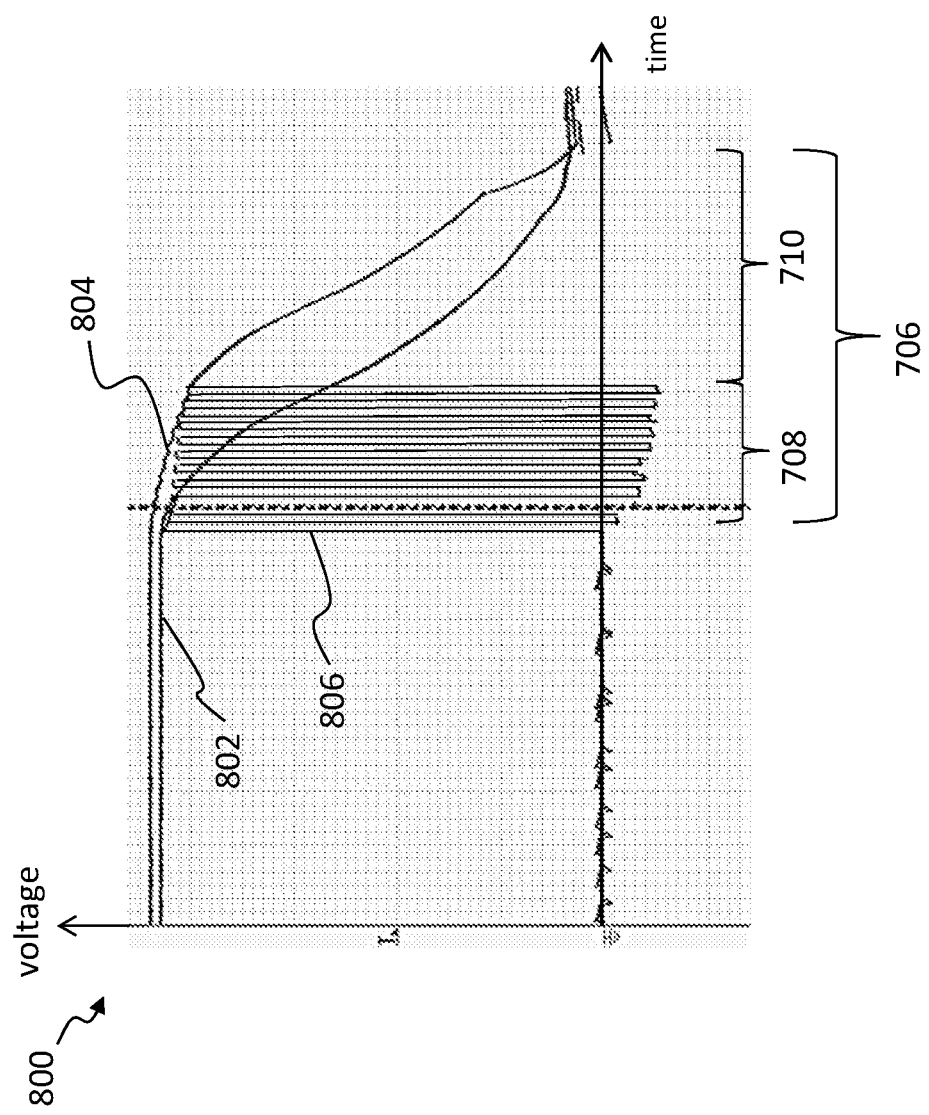
FIG. 8 is a graph of the voltage of a pick capacitor during a first pick method and a second pick method, and the voltage on the coil of the main valve during the second pick method.

FIG. 8 is a graph 800 showing the voltage of the pick capacitor 508 during the first pick method (trace 802) and the second pick method trace 804), as well as the voltage on the coil of the main valve 312 during the second pick method (trace 806).

In the example embodiment, the controller 306 again determines if the main valve 312 was successfully opened after attempting to pick the main valve 312 using the second pick method. If the attempt to pick the main valve 312 is determined to be unsuccessful, the controller 306 attempts to pick the main valve 312 using the first pick method. This pattern of alternating the first pick method and the second pick method (with a determination of whether the pick was successful after each attempted pick) repeats until the main valve 312 is successfully opened or a predetermined amount of time has elapsed. In the example embodiment, the predetermined amount of time is sixty minutes. Alternatively, the predetermined amount of time may be any other suitable amount of time. Other embodiments may use only the second pick method after the first unsuccessful attempted pick using the first pick method.

In some embodiments, the controller 306 outputs an alert if the main valve 312 is not successfully opened within the predetermined amount of time. The alert may be a human cognizable alert, such as a visual or audible alert at the water heater, or may be an alert signal sent to a remote computing device or a mobile computing device (such as an email or a text message to a mobile phone, or an alert signal to a system monitoring server).

The controller 306 delays a third length of time after each attempt to pick the main valve 312 before determining if the main valve 312 was successfully opened and again attempting to pick the main valve if the previous attempt was unsuccessful. This delay may allow the pick capacitor 508 to be recharged and may allow the water in the storage tank 22 to begin heating up so that a successful pick may be detected by the controller 306. In the example embodiment, the third length of time is 60 seconds. Alternatively, the third length of time may be longer or shorter than 60 seconds.

Embodiments of the methods and systems described herein achieve superior results compared to prior methods and systems. The detection of a failed attempt to pick the main valve and the repeated attempts to pick the main valve when it is determined that the previous attempt was unsuccessful may help avoid a failure to heat water when needed. Also, the use of the second pick method may produce vibrations in the main valve that can aid in freeing a sticking valve. Further, the dual main switch configuration limits or eliminates the flow of main valve picking current back to the thermoelectric generator without needing a large resistor between the thermoelectric generator and the main valve. This may prevent potential adverse consequences of the reverse current on the thermoelectric generator. Moreover, the dual main switch configuration simplifies the timing for applying the valve picking current and applying the main valve holding current. Further, the example safety switch configuration allows the controller to shut down the power supply to prevent the main valve and the pilot valve from being held open. Also, the safety switch configuration provides a different failure mode for the safety switch. For example, whether all switches of the control system fail shorted or fail open, no voltage is applied to the coils of the main and pilot valves.

Example embodiments of systems and methods for controlling a water heater are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A control system for controlling a gas powered water heater to heat water in a storage tank by burning gas at a main burner, the control system comprising:
a power system to provide electrical power for the control system;
a valve pick system configured to be coupled to a main gas valve of the main burner and to pick the main gas valve from a closed position to an open position, the valve pick system including a capacitor and a switch, the capacitor configured to store energy from the power system, and the switch configured to selectively couple the capacitor to the main gas valve; and
a controller electrically powered by the power system and communicatively coupled to the valve pick system, the controller configured to:
in response to a determination by the controller to ignite the main burner, attempt to pick the main gas valve from the closed position to the open position using a first pick method by:
closing the switch of the valve pick system to couple the capacitor to the main gas valve for a first length of time to discharge the energy stored in the capacitor to the main gas valve, and
opening the switch of the valve pick system after the energy stored in the capacitor is discharged to the main gas valve;
after attempting to pick the main gas valve using the first pick method, determine if the main gas valve is open; and
when the controller determines that the main gas valve is not open, attempt to pick the main gas valve from the closed position to the open position using a second pick method different than the first pick method, wherein the second pick method comprises:
repeatedly closing and opening the switch of the valve pick system to alternately couple and decouple the capacitor to the main gas valve until the energy stored in the capacitor is discharged to the main gas valve; and
opening the switch of the valve pick system after the energy stored in the capacitor is discharged to the main gas valve;
wherein the controller is further configured to:
determine if the main gas valve is open after attempting to pick the main gas valve using the second pick method; and
when the controller determines that the main gas valve is not open after attempting to pick the main gas valve using the second pick method, attempting to pick the main gas valve of the main burner using the first pick method.

2. The control system of claim 1, wherein the second pick method comprises:
repeatedly closing and opening the switch of the valve pick system for a second length of time shorter than the first length of time; and
holding the switch of the valve pick system closed after an end of the second length of time until the energy stored in the capacitor is discharged to the main gas valve.

3. A control system for controlling a gas powered water heater to heat water in a storage tank by burning gas at a main burner, the control system comprising:
a power system to provide electrical power for the control system;
a valve pick system configured to be coupled to a main gas valve of the main burner and to pick the main gas valve from a closed position to an open position, the valve pick system including a capacitor and a switch, the capacitor configured to store energy from the power system, and the switch configured to selectively couple the capacitor to the main gas valve; and
a controller electrically powered by the power system and communicatively coupled to the valve pick system, the controller configured to:
in response to a determination by the controller to ignite the main burner, attempt to pick the main gas valve from the closed position to the open position using a first pick method by:
closing the switch of the valve pick system to couple the capacitor to the main gas valve for a first length of time to discharge the energy stored in the capacitor to the main gas valve, and
opening the switch of the valve pick system after the energy stored in the capacitor is discharged to the main gas valve;
after attempting to pick the main gas valve using the first pick method, determine if the main gas valve is open; and
when the controller determines that the main gas valve is not open, attempt to pick the main gas valve from the closed position to the open position using a second pick method different than the first pick method, wherein the second pick method comprises:
repeatedly closing and opening the switch of the valve pick system to alternately couple and decouple the capacitor to the main gas valve until the energy stored in the capacitor is discharged to the main gas valve; and
opening the switch of the valve pick system after the energy stored in the capacitor is discharged to the main gas valve;
wherein the controller is further configured to:
determine if the main gas valve is open after each attempt to pick the main gas valve; and
when the controller determines that the main gas valve is not open after a previous attempt to pick the main gas valve, attempt to pick the main gas valve using whichever of the first pick method and the second pick method was not used in the previous attempt to pick the main gas valve.

4. The control system of claim 1, wherein the controller is configured to determine if the main gas valve is open based at least in part on signals received from a sensor of the gas powered water heater.

5. The control system of claim 4, wherein:
the sensor comprises a temperature sensor that detects a temperature of water in the storage tank of the gas powered water heater; and
the controller is configured to determine that the main gas valve is not open when the signals from the sensor indicate that the water in the storage tank has not increased in temperature after the attempt to pick the main gas valve.

6. The control system of claim 1, wherein the power system comprises a thermoelectric generator configured for thermal communication with a pilot burner.

7. The control system of claim 6, wherein:
the power system further comprises a self-oscillating power converter coupled to receive a first voltage output from the thermoelectric generator and generate a second voltage output greater than the first output voltage;
the controller is electrically powered by the second voltage output from the self-oscillating power converter; and
the controller is configured to provide a pick voltage substantially equal to the second voltage output to the valve pick system to charge the capacitor.

8. The control system of claim 1, wherein the controller is configured to wait a third length of time after attempting to pick the main gas valve using the first pick method before determining if the main gas valve is open.

9. A water heater comprising:
a storage tank for storing water;
a main burner to burn gas to heat the water in the storage tank;
a main gas valve coupled to the main burner and having an open position permitting gas flow through the main gas valve and a closed position preventing gas flow through the main gas valve; and
a control system to control operation of the main burner to provide water in the storage tank substantially at a setpoint temperature, the control system comprising:
a power system to provide electrical power for the control system;
a valve pick system coupled to the main gas valve to pick the main gas valve from a closed position to the open position, the valve pick system including a capacitor and a switch, the capacitor configured to store energy from the power system, and the switch configured to selectively couple the capacitor to the main gas valve;
a controller electrically powered by the power system and communicatively coupled to the valve pick system, the controller configured to:
in response to a determination by the controller to ignite the main burner, attempt to pick the main gas valve from the closed position to the open position using a first pick method by:
closing the switch of the valve pick system to couple the capacitor to the main gas valve for a first length of time to discharge the energy stored in the capacitor to the main gas valve, and
opening the switch of the valve pick system after the energy stored in the capacitor is discharged to the main gas valve;
after attempting to pick the main gas valve using the first pick method,
determine if the main gas valve is open; and
when the controller determines that the main gas valve is not open after attempting to pick the main gas valve using the first pick method, attempt to pick the main gas valve from the closed position to the open position using a second pick method different than the first pick method, wherein the second pick method comprises:
repeatedly closing and opening the switch of the valve pick system to alternately couple and decouple the capacitor to the main gas valve until the energy stored in the capacitor is discharged to the main gas valve; and
opening the switch of the valve pick system after the energy stored in the capacitor is discharged to the main gas valve;
wherein the controller is further configured to:
determine if the main gas valve is open after attempting to pick the main gas valve using the second pick method; and
when the controller determines that the main gas valve is not open after attempting to pick the main gas valve using the second pick method, attempting to pick the main gas valve of the main burner using the first pick method.

10. The water heater of claim 9, wherein the second pick method comprises:
repeatedly closing and opening the switch of the valve pick system for a second length of time shorter than the first length of time; and
holding the switch of the valve pick system closed after an end of the second length of time until the energy stored in the capacitor is discharged to the main gas valve.

11. The water heater of claim 9, further comprising a temperature sensor that detects a temperature of water in the storage tank, wherein
the controller is configured to determine that the main gas valve is not open when signals from the temperature sensor indicate that the water in the storage tank has not increased in temperature after attempting to pick the main gas valve.

12. A method of controlling a gas powered water heater to produce hot water in a storage tank by burning gas at a main burner, the method comprising:
attempting, by a controller and in response to a determination by the controller to ignite the main burner, to pick a main gas valve of the main burner from a closed position to an open position using a first pick method by:
closing a switch of a valve pick system to couple a capacitor of the valve pick system to the main gas valve for a first length of time to discharge energy stored in the capacitor to the main gas valve to pick the main gas valve, and
opening the switch of the valve pick system after the energy stored in the capacitor is discharged to the main gas valve;
determining, by the controller, if the main gas valve is open after attempting to pick the main gas valve using the first pick method; and
when the controller determines that the main gas valve is not open after attempting to pick the main gas valve using the first pick method, attempting to pick the main gas valve from the closed position to the open position using a second pick method different than the first pick method, wherein attempting to pick the main gas valve using the second pick method comprises:
repeatedly closing and opening the switch of the valve pick system to alternately couple and decouple the capacitor to the main gas valve until the energy stored in the capacitor is discharged to the main gas valve; and
opening the switch of the valve pick system after the energy stored in the capacitor is discharged to the main gas valve;

the method further comprising:
determining if the main gas valve is open after attempting to pick the main gas valve using the second pick method; and
when the controller determines that the main gas valve is not open after attempting to pick the main gas valve using the second pick method, attempting to pick the main gas valve of the main burner using the first pick method.

13. The method of claim 12, wherein attempting to pick the main gas valve using the second pick method comprises:
repeatedly closing and opening the switch of the valve pick system for a second length of time shorter than the first length of time; and
holding the switch of the valve pick system closed after an end of the second length of time until the energy stored in the capacitor is discharged to the main gas valve.

14. A method of controlling a gas powered water heater to produce hot water in a storage tank by burning gas at a main burner, the method comprising:
attempting, by a controller and in response to a determination by the controller to ignite the main burner, to pick a main gas valve of the main burner from a closed position to an open position using a first pick method by:
closing a switch of a valve pick system to couple a capacitor of the valve pick system to the main gas valve for a first length of time to discharge energy stored in the capacitor to the main gas valve to pick the main gas valve, and
opening the switch of the valve pick system after the energy stored in the capacitor is discharged to the main gas valve;
determining, by the controller, if the main gas valve is open after attempting to pick the main gas valve using the first pick method; and
when the controller determines that the main gas valve is not open after attempting to pick the main gas valve using the first pick method, attempting to pick the main gas valve from the closed position to the open position using a second pick method different than the first pick method, wherein attempting to pick the main gas valve using the second pick method comprises:
repeatedly closing and opening the switch of the valve pick system to alternately couple and decouple the capacitor to the main gas valve until the energy stored in the capacitor is discharged to the main gas valve; and
opening the switch of the valve pick system after the energy stored in the capacitor is discharged to the main gas valve;
the method further comprising:
determining if the main gas valve is open after each attempt to pick the main gas valve; and
when the controller determines that the main gas valve is not open after a previous attempt to pick the main gas valve, attempting to pick the main gas valve using whichever of the first pick method and the second pick method was not used in the previous attempt to pick the main gas valve.

15. The control system of claim 3, wherein the second pick method comprises:
repeatedly closing and opening the switch of the valve pick system for a second length of time shorter than the first length of time; and
holding the switch of the valve pick system closed after an end of the second length of time until the energy stored in the capacitor is discharged to the main gas valve.

16. The control system of claim 3, wherein the controller is configured to determine if the main gas valve is open based at least in part on signals received from a sensor of the gas powered water heater.

17. The control system of claim 16, wherein:
the sensor comprises a temperature sensor that detects a temperature of water in the storage tank of the gas powered water heater; and
the controller is configured to determine that the main gas valve is not open when the signals from the sensor indicate that the water in the storage tank has not increased in temperature after the attempt to pick the main gas valve.

18. The control system of claim 3, wherein the power system comprises a thermoelectric generator configured for thermal communication with a pilot burner.

19. The control system of claim 18, wherein:
the power system further comprises a self-oscillating power converter coupled to receive a first voltage output from the thermoelectric generator and generate a second voltage output greater than the first output voltage;
the controller is electrically powered by the second voltage output from the self-oscillating power converter; and
the controller is configured to provide a pick voltage substantially equal to the second voltage output to the valve pick system to charge the capacitor.

20. The control system of claim 3, wherein the controller is configured to wait a third length of time after attempting to pick the main gas valve using the first pick method before determining if the main gas valve is open.

21. The method of claim 14, wherein attempting to pick the main gas valve using the second pick method comprises:
repeatedly closing and opening the switch of the valve pick system for a second length of time shorter than the first length of time; and
holding the switch of the valve pick system closed after an end of the second length of time until the energy stored in the capacitor is discharged to the main gas valve.

22. A water heater comprising:
a storage tank for storing water;
a main burner to burn gas to heat the water in the storage tank;
a main gas valve coupled to the main burner and having an open position permitting gas flow through the main gas valve and a closed position preventing gas flow through the main gas valve; and
a control system to control operation of the main burner to provide water in the storage tank substantially at a setpoint temperature, the control system comprising:
a power system to provide electrical power for the control system;
a valve pick system coupled to the main gas valve to pick the main gas valve from a closed position to the open position, the valve pick system including a capacitor and a switch, the capacitor configured to store energy from the power system, and the switch configured to selectively couple the capacitor to the main gas valve;
a controller electrically powered by the power system and communicatively coupled to the valve pick system, the controller configured to:

in response to a determination by the controller to ignite the main burner, attempt to pick the main gas valve from the closed position to the open position using a first pick method by:

closing the switch of the valve pick system to couple the capacitor to the main gas valve for a first length of time to discharge the energy stored in the capacitor to the main gas valve, and opening the switch of the valve pick system after the energy stored in the capacitor is discharged to the main gas valve;

after attempting to pick the main gas valve using the first pick method, determine if the main gas valve is open; and when the controller determines that the main gas valve is not open after attempting to pick the main gas valve using the first pick method, attempt to pick the main gas valve from the closed position to the open position using a second pick method different than the first pick method, wherein the second pick method comprises:

repeatedly closing and opening the switch of the valve pick system to alternately couple and decouple the capacitor to the main gas valve until the energy stored in the capacitor is discharged to the main gas valve; and opening the switch of the valve pick system after the energy stored in the capacitor is discharged to the main gas valve;

wherein the controller is configured to:

determine if the main gas valve is open after each attempt to pick the main gas valve; and when the controller determines that the main gas valve is not open after a previous attempt to pick the main gas valve, attempt to pick the main gas valve using whichever of the first pick method and the second pick method was not used in the previous attempt to pick the main gas valve.

23. The water heater of claim 22, wherein the second pick method comprises:

repeatedly closing and opening the switch of the valve pick system for a second length of time shorter than the first length of time; and holding the switch of the valve pick system closed after an end of the second length of time until the energy stored in the capacitor is discharged to the main gas valve.

24. The water heater of claim 22, further comprising a temperature sensor that detects a temperature of water in the storage tank, wherein the controller is configured to determine that the main gas valve is not open when signals from the temperature sensor indicate that the water in the storage tank has not increased in temperature after attempting to pick the main gas valve.

* * * * *